United States Patent [19]
Monaghan

[11] 3,759,343
[45] Sept. 18, 1973

[54] VEHICLE SAFETY DEVICE

[76] Inventor: James Monaghan, 11849 Clifton Blvd., Apt. 204-A, Lakewood Gardens, Lakewood, Ohio

[22] Filed: May 4, 1972

[21] Appl. No.: 250,413

Related U.S. Application Data

[63] Continuation-in-part of Ser. No. 163,379, July 16, 1971.

[52] U.S. Cl. ............................. 180/91, 280/150 B
[51] Int. Cl. ............................................. B60n 21/10
[58] Field of Search .................. 280/150 B; 180/82, 180/91

[56] References Cited
UNITED STATES PATENTS

| 3,633,936 | 1/1972 | Huber | 280/150 B |
| 3,129,017 | 4/1964 | Graham | 280/150 B |
| 3,393,010 | 7/1968 | Steinberg | 280/150 B |

Primary Examiner—Robert R. Song
Attorney—Albert R. Teare et al.

[57] ABSTRACT

The disclosure relates to a vehicle occupant restraint device. The device comprises a resilient pad for restraining the occupant, a transversely extending rigid support crossmember for disposing the pad in spaced proximity to the occupant's torso and a horizontal adjustment mechanism which permits adjustment of the horizontal spacing between the occupant's torso and the pad while preserving the disposition of the pad in an attitude parallel to the transverse general plane of the occupant's torso.

The device also may include an automatic operation system for positively restraining an occupant on accident impact. This automatic operation system may include means for facilitating disengagement of the adjustment mechanism during its operation.

9 Claims, 15 Drawing Figures

Patented Sept. 18, 1973

Patented Sept. 18, 1973 3,759,343
5 Sheets-Sheet 4
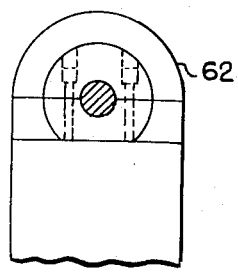
FIG.5
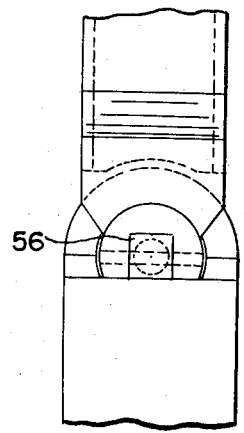
FIG.6
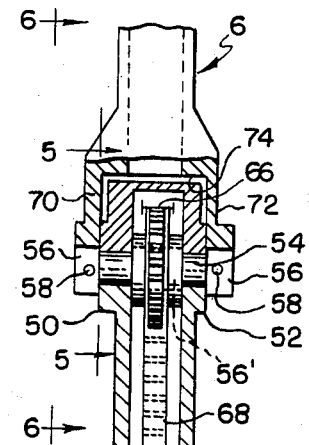
FIG.4
FIG.7
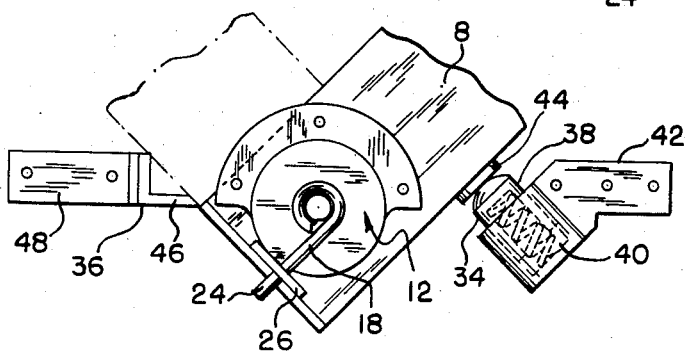
FIG.8

3,759,343

VEHICLE SAFETY DEVICE

CROSS REFERENCE TO RELATED APPLICATION

The present application is in a continuation in part of its parent United States Patent Application, Ser. No. 163,379 of James Monaghan, which was filed on July 16, 1971.

BACKGROUND OF THE INVENTION

The present invention relates to a vehicle occupant safety device, particularly to an occupant restraint device.

Restraining safety devices previously used have primarily comprised fabric belts which were secured across one or more portions of the occupant's body, such as across the abdomen and chest. When using these devices, the vehicle occupant was confined in place and unable to move within the vehicle without completely releasing the device. In the event of an accident, these resraints might jam and trap the occupant. Since the occupant could not move within the vehicle without relasing the device, reaching for the glove compartment or paying a toll required release of the device and was, therefore, inconvenient. In addition, the belts, while not in use, tend to get trapped with adjacent seats or drag on the floor. Further, handicapped persons with only one arm or hand had difficulty in locking the belts in place.

In addition, these former devices were not readily adapted to automatic operation for positively restraining the occupant on accident impact. Proposed automatic passive restraint devices comtemplate the restraint surface passing very rapidly across a distance to contact the occupant. This action may cause injury to the occupant and could instill fear of the restraint in the occupant.

SUMMARY OF THE INVENTION

The vehicle occupant restraint device of the present invention comprises a resilient pad for restraining the occupant, a transversely extending rigid support crossmember for locating and orienting the pad in horizontally spaced proximity to the occupant's torso and a horizontal adjustment mechanism which permits adjustment of this spacing, while preserving the orientation of the pad in its attitude parallel to the transverse general plane of the occupant's torso. Preferably, this adjustment mechanism comprises a transverse pivot shaft which rotationally mounts a rotatable support arm and an associated vertical support arm. The vertical orientation of the vertical arm is maintained by a planetary action mechanism coacting between the pivot shaft and the vertical arm. The adjustment mechanism is releasably lockable by means of a clutch which coacts between the pivot shaft and the rotatable arm. In a modified form of the present invention a system is provided for automatically positively restraining the occupant on accident impact. This form may be further modified to facilitate the operation of the automatic restraint.

It is an object of the present invention to provide a vehicle occupant restraint of optimum size and positioning in front of the occupant's torso while keeping rigid supporting structure to a minimum. It is also an object to provide convenient adjustment and retraction of the device, even for handicapped persons, while minimizing the possibility of accidental disengagement of the restraint. Preferably, the restraint is easily accessible for service, or even quick removal in the event of an accident.

It is a further object of the present invention to provide a restraint device which can be readily modified to have automatic passive operation for restraining the occupant on accident impact. In this modified form of the present invention, it is an object to apply the restraint from a point in close proximity to the occupant and to apply the restraining force to the occupant's body at a low pressure and thereafter increase it to a desired maximum. It is also the object of an alternative embodiment of this modified form to facilitate the movement of the resilient pad in applying restraining force. It is a still further object to provide a restraint device which does not instill fear in the occupant and is convenient and attractive to the occupant so as to encourage use, even as an arm rest.

These and other objects and advantages may be found in the following disclosure.

BRIEF DESCRIPTION OF THE DRAWINGS

FIG. 4 is a fragmentary front elevation view, partially cut away and partially in section, of a lower portion of the device of FIG. 1;

FIG. 5 is a side elevation view, partially in section, taken along the line 5—5 of FIG. 4;

FIG. 6 is a side elevation view taken along the line 6—6 of FIG. 4;

FIG. 7 is a side elevation view taken along the line 7—7 of FIG. 4;

FIG. 8 is a side elevation view along the line 8—8 of FIG. 4 of the lower portion of the device shown in FIG. 1;

DESCRIPTION OF THE PREFERRED EMBODIMENT

Figures 1, 2:
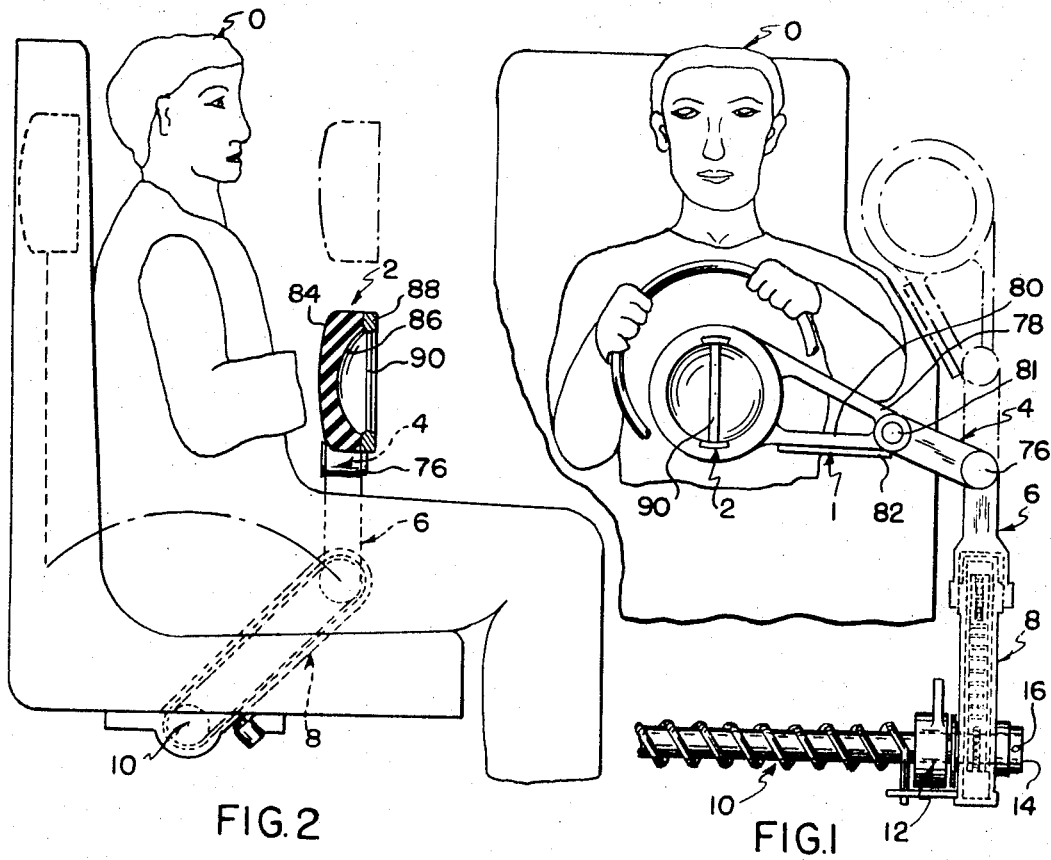
FIG. 1 is a front elevation view, partially cut away, illustrating the restraint device 1 of the present invention installed in a vehicle.
FIG. 2 is a side elevation view, partially cut away and partially in section, illustrating the device of FIG. 1.

The preferred embodiment of the restraint device 1 of the present invention illustrated in FIG. 1, comprises a resilient restraint pad 2, a pad support crossmember 4 mounted for limited angular movement in a transversely extending, vertical plane and a horizontal adjustment mechanism. This mechanism comprises a vertically oriented support arm 6 for preserving the aforesaid angular movement of the pad 2 and crossmember 4 while permitting horizontal adjustment of the pad 2 with respect to the vehicle occupant O; a rotatable support arm 8 for moving the aforesaid members which rotates in a longitudinally extending, vertical plane; a transverse pivot shaft 10 for the arm 8; and a clutch mechanism 12 which releasably locks the pivoted arm 8 to the stationary pivot shaft 10. This construction releasably locks the restraint pad 2 in a horizontally adjusted position in proximity with the front of the occupant's torso and restrains him from striking the forward portions of the vehicle while minimizing the amount of structure in front of the occupant.

In operating the device from its retracted position (the dotted line showing in FIG. 2) in which the pad 2 is in its uppermost position and situated rearwardly of the occupant, the occupant reaches up to a convenient shoulder height and grasps the crossmember 4 and pulls it forward to a ready position (the dot-dash showing of FIGS. 1 and 2) slightly in front of him. He then draws the pad 2 and its associated crossmember 4 down in front of him and adjusts the horizontal spacing of the pad with respect to his torso, so that it is located adjacent his center of gravity as he is sitting. On completion of the adjustment, he locks the clutch 12 to preserve the spacing. If the occupant later wants to withdraw the restraint without affecting his adjustment, he needs only to termporarily lift the crossmember 4 and pad 2 back into the ready position. During this operation, the clutch 12 reamins locked in the adjusted position until released.

In the preferred form of the restraint device 1, the stationary pivot shaft 10 is mounted on and supported by the occupant's seat assembly. This mounting site permits the occupant to adjust his seat forward or backward with respect to the vehicle without affecting the horizontal orientation of the device 1 with respect to himself. Where the seat's angular orientation can be adjusted, such as by canting backward, it is preferred that the shaft 10 be mounted on the seat so as to angularly move with the seat and occupant.

The transverse orientation of the shaft 10 with respect to the vehicle and occupant provides a transverse pivot axis for the rotation of the rotatable support arm 8 in its longitudinally extending, vertical plane. To provide firm mounting of the device 1, the opposed end of the shaft 10 is fixedly secured to the vehicle, preferably to the seat, as aforesaid.

The rotating arm, as may be seen in FIG. 4, is biased and urged rearwardly by a helical torsion spring 18 on the shaft 10 so that the arm 8 will tend to rotate rearwardly when it is free to rotate. The convolutions of this spring 18 encompass the shaft 10 and extend lengthwise of it, thereby saving space. If desired, a tubular cover for the spring 18 can be provided which encompasses both it and the shaft 10. One end 19 of the spring 18 is fixedly mounted to the shaft 10 by an arm 20 of a stationary collar 22 affixed to the shaft. The opposite end 24 of spring 18 is rotationally moveable and engages an arm 26 extending transversely from the lower end of the rotatable support arm 8 (FIGS. 4 and 8). This provides the aforementioned rearward biasing of the rotatable arm 8.

The rotatable arm 8 is rotatably attached at its lower end to the transverse pivot shaft 10 so that it will rotate in a vertical plane which extends longitudinally of the vehicle and also perpendicularly to the general plane of the occupant's torso. Preferably, it is mounted on the outer end of the transverse pivot shaft 10 so that it is situated between the occupant and the outside of the vehicle, thereby providing convenient access to it. Preferably, the arm 8 is secured to the rod 10 by an annular collar 14 and a lock pin 16 (FIGS. 1, 3, 4 and 7) which are affixed to the pivot shaft 10. The transverse positioning of the arm 8 on the shaft 10 is effected by the same collar 14 and the clutch 12.

The rotatable arm 8 is provided with inner and outer circular bosses, 28 and 30 respectively, which are journaled for rotation on internal extensions 15 and 15' of the collar 14 (FIG. 3) and which act as bearings for the arm 8. Both bosses 28 and 30 also act to transversely position the arm 8 on the shaft 10. An enlarged diameter portion 15 of the internal extension of collar 14 also prevents outward transverse shifting of the arm 8. A slotted reduced diameter portion 15' on the extension of collar 14 permits the arm 8 to shift transversely inwardly on actuation of the electromagnetic clutch 12. The exposed inner face of the inner boss 28 is provided with a magnetizable friction disk or pad 32 which, on actuation of the electromagnetic clutch 12, coacts with the clutch 12 to lock the arm 8 in a fixed position. This locking action also locks the horizontal position of the restraint pad 2, as well. The actuation of the electromagnetic clutch 12 causes the disc 32 to draw against the confronting face of the stationary clutch 12 to cause this locking.

The forward and rearward rotation of the pivoted arm 8 is confined to a limited angle, such as 90°, by the front and rear stops (FIG. 8), 34 and 36 respectively. In the form shown, the front stop comprises a spring loaded piston 38 which rides in a cylindrical hole 40 in the front stop support bracket 42 to provide a resilient fail safe action. The piston 38 has a convex face which abuts against a wear plate 44 on the forward side of the arm 8. Preferably, the piston's axis of movement is depressed at an angle of about 45° from the vertical so that the arm 8 can swing forward about 45° from the vertical. When the arm 8 is depressed forward more than 45° from the vertical (such as during a slippage of the clutch 12 on severe impact in an accident), the spring-urged, forward stop would resiliently resist this extreme depression until the forward force pushed the piston face below the cylinder mouth, at which point the forward edge of the arm 8 would finally abut the rigid support bracket 42. This provides the aforesaid resilient fail safe action. The rear stop 36 is rigid and comprises a longitudinal support bracket 48 and an L-shaped stop bracket 46 which extends transversely of it and limits the rearward rotation of the support arm 8. This stop 36 is oriented so that the pivoted arm 8 can be rearwardly depressed about 45° from the vertical.

The upper end of the pivoted arm 8 is provided with inner and outer integral bosses 50 and 52 respectively, which are journaled for the rotation of an upper transverse shaft 54. This shaft 54, in turn, mounts the vertical arm 6 on the rotatable arm 8. While this shaft is free to rotate on the rotatable arm 8, it is fixedly secured to vertical arm 6 such as by having square headed ends 56 of increased dimension and lock pins 58 extending through the shaft 54 and arm 6. (FIGS. 5 and 6).

Means for maintaining the vertical orientation of the vertical arm 6 coact between this upper transverse shaft 54 and the lower transverse pivot rod 10. In the form shown, this means is housed within the rotatable arm 8 for convenience and safety. Accordingly, the arm 8 is hollow or tubular with an access plate 60 bolted to its lower end and a journaled convex access cover 62 bolted on its upper end. As shown, the upper access cover 62 is tapbolted through the integral bosses 50 and 52 to the rotatable arm 8 (FIG. 5). This construction safely and effectively encloses an orientation maintenance means while still providing easy service access.

In the form shown, the vertical orientation maintenance means is a planetary action chain and sprocket drive which comprises a lower sprocket 64, an upper sprocket 66 and an interconnecting chain 68. The lower sprocket 64 is rigidly fixed against rotation by a square key which fits into a slot on the reduced diameter extension 15' and one on the sprocket itself. However, this key and slot arrangement does permit the lower sprocket 64 to shift transversely along with the arm 8 as the clutch 12 is engaged and disengaged since the slot on the sprocket 64 is longer than the key. The upper sprocket 66 has a square aperture and is rigidly fixed against rotation on a central, squared portion 56' of the shaft 54 which is the same size as the end squares 56 (FIG. 4) since, unlike the lower sprocket 64, transverse shifting is not needed. Preferably, the upper and lower sprockets are of equal diameter so that as the arm 8 (and its associated upper sprocket 66) and vertical arm 6 are angularly deflected with respect to the transverse shaft 10 (and its associated lower sprocket 64), the upper sprocket 66 is angularly deflected an equal amount in the opposite direction thereby maintaining the predetermined vertical orientation of the vertical arm 6. It should be understood that other parallel action mechanisms, such as parallelogram connections, known in the art, may also be used so that the vertical orientation of the vertical arm 6 is preserved throughout its movement.

In the form shown, the vertical arm 6 is a tubular member with a transverse pivotal connection at its lower end and a longitudinal pivotal connection at its upper end. The lower end is bifurcated to provide inner and outer legs 70 and 72, respectively, which abut and bearingly engage the inner and outer bosses 50 and 52 of the rotatable arm 8. Each of these legs has a square aperture for receiving the respective square headed end 56 of the shaft 54. Through the use of this interconnection and the lock pins 58, the vertical arm 6 is securely fastened to the shaft 54 and its associated upper sprocket 66. The lower end portion 74 of the vertical arm 6 which interconnects the legs 70 and 72 is spaced from the upper end of the rotatable arm 8 and is concavely configured in side elevation to provide clearance between the convex access cover 62 and itself.

The upper end of the vertical arm 6 is provided with a pivot 76 whose axis of rotation extends horizontally and longitudinally of the vehicle so that the crossmember 4 and pad 2 may be rotated in and out of position in a transversely extending vertical plane. Preferably, this rotation is through a limited angle, such as 60°. The crossmember 4 is preferably releasably locked at each limit of its rotation such as by a spring-loaded detent (not shown) mounted on the vertical arm 6 which fits into a pair of angularly spaced apertures or depressions in the crossmember 4 (not shown). In this way the crossmember may be releasably locked in either a vertical position or a position which is depressed 60° from the vertical. To prevent rotational travel beyond these releasable locking points a limiting stop, such as is known in the art, should be provided at each limit of the arm's travel. The pad support crossmember 4 is mounted on pivot 76 for rotation in a transversely extending vertical plane so that it can swing parallel to the general plane of the occupant's torso. In its preferred form, the crossmember 4 is bifurcated or Y-shaped with upper and lower supports, 78 and 80, respectively, attaching the restraint pad 2 to the crossmember 4. The upper support 78 follows the general axis of the crossmember while the lower support 80 diverges outwardly away from this axis so that the upper ends of the supports 78 and 80 attach to the pad 2 at spaced points on the pad's periphery. Each of these supports 78 and 80 provide convenient hand grips for moving the device 1. Preferably, a clutch actuation switch 81 is mounted at the junction of the supports 78 and 80 with a switch lever 82 extending along the lower edge of the support 80 to provide convenient actuation of the clutch 12. This construction permits single hand use of the device 1.

The restraint pad 2 is preferably made of a resilient material, such as foam rubber, with a circular configuration when viewed in front elevation. In side elevation, the front, or proximal surface 84 to the occupant O is convex and the rear surface 86 is concave to gradually cushion and restrain the impact of the occupant. A circular reinforcement ring 88 is embedded into the distal surface of the pad to preserve its circular configuration and provide mounting points for the crossmember 4. Preferably, the pad 2 has a rotatable handgrip 90 which the occupant can grasp. As shown, this grip 90 extends across the interior of the concavity formed by the surface 86 and slides on the reinforcing ring 88.

In a typical operation of the device 1, the device 1 is initially positioned in a retracted position (FIG. 2, dotted line showing) with the restraint pad 2 located to the rear of the occupant slightly above his outer shoulder. In this position, the spring 18 has depressed the rotatable arm 8 about 45° from the vertical and the vertical arm 6, the crossmember 4 and the pad 2 are all vertically aligned and positioned. To use the device 1, the occupant grasps either the lower crossmember support 80 or the pad handgrip 90 and draws the pad 2 forward to a ready position (FIG. 2, dot-dash position) with the pad 2 at approximately the desired horizontal spacing from the transverse vertical plane crossing the front of his torso. In this position, the vertical arm 6, the crossmember 4, and the pad 2 are still vertically aligned, but the rotatable arm 8 has been rotated forward against the force of spring 18. The clutch 12 has not yet been actuated so that release of the handgrip by the occupant would allow the device to return to its retracted position.

Next, the occupant pivots the pad 2 and the crossmember 4 transversely down to put the pad 2 in its lowest position and makes the final adjustment of the horizontal spacing between the pad 2 and his torso. With the pad 2 and crossmember 4 in this final position he actuates the clutch actuating switch 81, thereby locking the clutch 12 and the rotatable arm 8 in position.

If, while riding, the occupant should desire to temporarily remove the restraint, he need only lift the pad 2 back into the ready position. He can then return the pad to its adjusted position without further adjustment. A suitable warning system can be provided to prevent operation of the vehicle without the restraint pad 2 being down in position to protect the rider's torso.

To retract the device 1 to its initial position, the occupant need only raise the pad and crossmember 4 to the ready position and actuate the clutch actuating switch from the ready position. This releases the clutch and the pad 2 can be allowed to retract to the initial position using the force of the spring 18.

Figure 9:
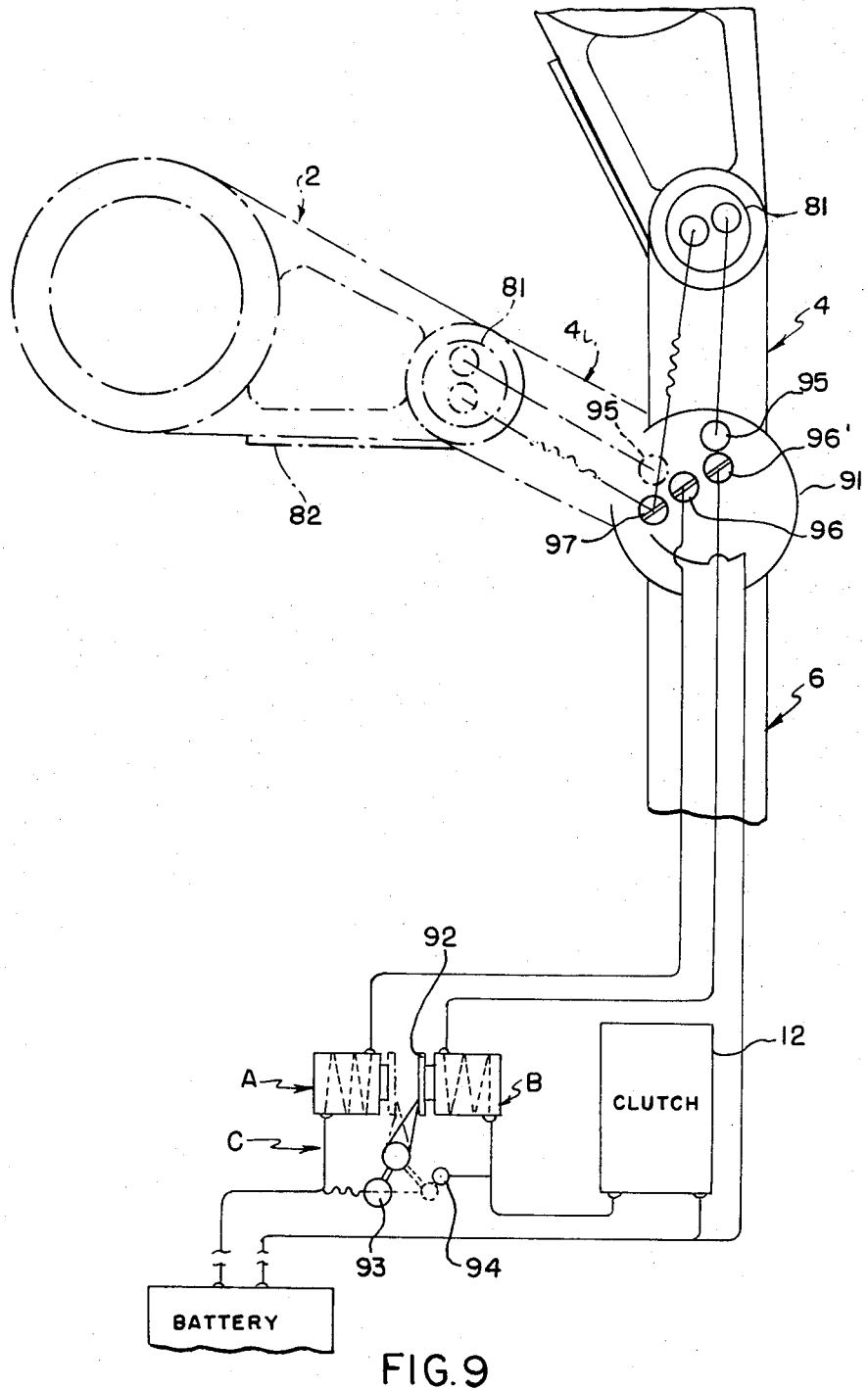
FIG. 9 is a diagrammatic representation of the clutch actuation system of the preferred embodiment of the present invention.

More specifically, FIG. 9 diagrammatically illustrates the electrical system for engaging and disengaging the electromagnetic clutch 12. This system uses a locking type relay C which has a coil A to engage the clutch 12 and a separate coil B to disengage the clutch 12. A two-position master switch 91 is mounted at the juncture of the crossmember 4 and the vertical arm 6 so that rotation of the pad 2 and crossmember 4 will alternately permit actuation of either the engaging relay coil A or the disengaging relay coil B by the single hand switch 81. In a typical operation of the electrical system with the pad 2 in the ready position, the clutch 12 is disengaged. In this condition, a pivoted contact lever 92 is held over against the disengaging relay coil B by a spring (not shown) with a clutch control contact 93 on its lower end out of electrical contact with clutch contact point 94. As the pad 2 and crossmember 4 are swung down to the restraint position (FIG. 9, dot-dash line showing), movable contact 95 attached to the crossmember 4 is moved into electrical contact with an engaging coil contact 96 in the master switch 91. When the electrical contacts in the hand switch are closed, such as by actuating the hand lever 82, electrical energy flows from one pole of the vehicle's battery through the clutch engaging coil A, the engaging contacts 95 and 96, the hand switch 81, the stationary pivot contact 97 in the master switch 91, and back to the opposite pole of the battery, thereby energizing the engaging relay coil A. This causes the contact lever 92 to be pulled away from relay coil B over to relay coil A where it is held by a spring (not shown). This swinging brings the contact 93 into engagement with contact 94, thereby causing electrical energy to flow from one pole of the battery through contacts 93 and 94 and the electromagnetic clutch 12 and back to the opposite pole of the battery, energizing the clutch 12 and drawing the disc 32 against it. Subsequent opening or closing of the contacts in the hand switch 81 has no effect on the clutch 12 which is locked in its engaged condition until the pad 2 and crossmember 4 are again raised to the vertical ready position.

In order to disengage the clutch 12, the occupant must raise the pad 2 and crossmember 4 to the aforesaid vertical ready position. In this position, the contact 95 has rotated to engage the disengaging contact 96' of the master switch 91. On actuation of the hand switch 81 in this position, electrical energy flows from one pole of the battery through the contacts 93 and 94 (which are still in contact) the relay coil B, the contacts 95 and 96', the engaging contacts of the hand switch 81, the pivot contact 97 and back to the opposite pole of the battery. This flow energizes the relay coil B, pulling the contact lever 92 away from relay coil A and toward relay coil B where it is held by a spring (not shown), thereby breaking the contact between contacts 93 and 94 and de-energizing the clutch 12. Preferably, the connecting wires between the battery and contact 93 and between contact 97 and hand switch 81 should be provided with retractable coiled springs so that the contact lever 92 and crossmember 4, respectively, can rotate. Where desired, the device 1 may be wired so that the vehicle's ignition cannot be operated without the pad 2 being in the horizontally adjusted, restraint position.

Figure 4A:
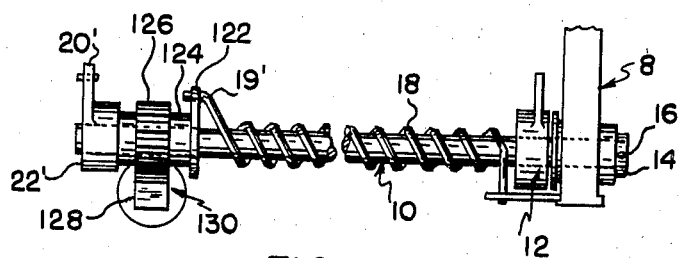
FIG. 4A is a fragmentary front elevation view, partially cut away and partially in section, illustrating a modified embodiment of the lower portion shown in FIG. 4.
Figure 10:
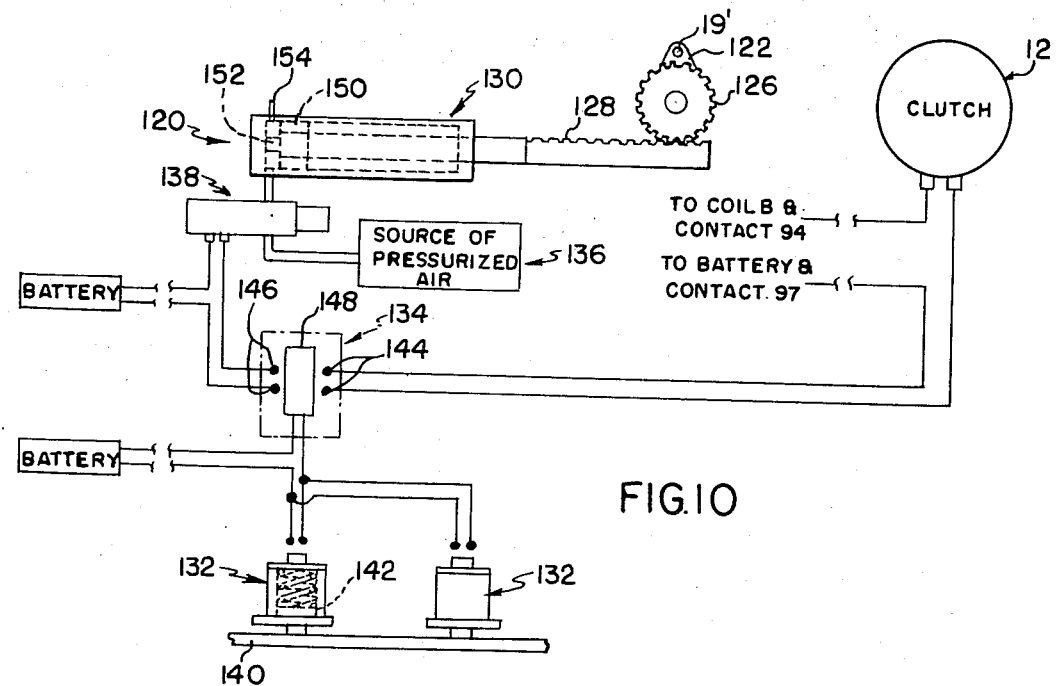
FIG. 10 is a diagrammatic representation of the automatic restraint system of a modified embodiment of the present invention.
Figure 4B:
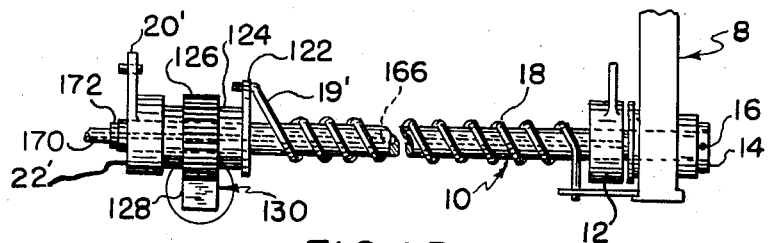
FIG. 4B is a fragmentary front elevation view, partially cut away and partially in section, illustrating a further modified embodiment of the lower portion of the device shown in FIG. 4.

In FIGS. 4A and 10 there is shown a modified embodiment of the present invention which provides an automatic positive restraint of the occupant on impact. In this embodiment an automatic restraint system 120 senses an accident impact to the vehicle and increases the rearward directing force applied to the rotatable arm 8 while releasing the clutch 12.

In the form shown, the stationary collar 22' is modified so that the arm 20' is used for attaching the collar 22' and shaft 10 to the vehicle and not for securing the interior end 19' of the spring 18. Instead the interior end 19' is attached to an end plate or arm 122 mounted on the exterior end of a rotatable sleeve 124. This sleeve 124 is rotatable on the shaft 10 so that the torsion of spring 18 can be increased. The increased torsion is effected by a gear 126 mounted on the sleeve 124 being driven by a rack 128 powered by penumatic cylinder 130. On actuation of the pneumatic cylinder 130, the rack 128 drives the gear 126, thereby rotating the sleeve 124 and increasing the torsion on the spring 18. The increased tension, in turn, increases the rearward force on the rotatable arm 8 and its associated restraint pad 2. By this arrangement, the rearward force of the restraint pad gradually increases as the rack 128 travels through its throw and the ultimate force of the pad against the occupant can be pre-determined.

The cylinder 130 is actuated upon the sensing of a vehicle impact event, such as an accident impact, by the electromechanical portion of the system 120. This portion also releases the clutch 12 so that the increased tension of spring 18 will move the arm 8 and its associated pad 2 rearward to automatically positively restrain the occupant.

In the form shown this portion of the system comprises at least one impact sensor 132, a dual function switch 134 for releasing the clutch 12 and actuating the cylinder 130, a source of pressurized air 136, a solenoid valve 138 for connecting the air source 136 to the cylinder 130 on actuation by switch 134, and the vehicle battery for supplying electrical energy to the appropriate foregoing components.

As shown, each sensor 132 comprises a shield 140 which protects the sensor against accidental actuation, and a press fit or spring biased plunger 142 which closes a pair of switching contacts (not shown) when pushed in. The force of an accident impact would crush or dent the shield 140 and push in the plunger 142. Preferably, a plurality of sensors 132 are disposed on the vehicle's periphery and wired in parallel so that an impact from the front, side, or rear would actuate the system. It should be understood that while impact sensors have been discussed, other appropriate sensing devices, such as proximity sensors could be used.

The dual function switch 134 is preferably constructed with a first pair of switching contacts 144 normally closed for controlling the clutch 12 and preserving its horizontal adjustment energization and with a second pair of switching contacts 146 which are normally open for controlling valve 138. On energization of a coil 148 by a sensor 132, contacts 144 are opened (deenergizing clutch 12) and contacts 146 closed (energizing valve 138). Preferably, the switch 134 is of a time delay type so that after a predetermined period of energization, such as one to two seconds, contacts 146 re-open, thereby releasing the increased rearward force of the pad 2 so that the occupant can either leave the vehicle or resume operation of it. In addition, the switch 134 preferably is resettable so that the contacts 144 can be reclosed even with a sensor 132 actuated. This would permit use of the normal horizontal adjustment feature in operating the vehicle after an accident impact until the sensor was repaired or otherwise deactivated.

The valve 138 is preferably a spring return solenoid pneumatic valve so that high pressure air will flow through it only during its period of energization. High pressure air is selectively transmitted from source 136 to the cylinder 130 via this valve 138.

The cylinder 130 is preferably a single acting pneumatic cylinder with rack 128 attached to one face of its piston 150. The other face of the piston is provided with a stop 152 with a diameter less than that of the interior wall of the cylinder 130 so as to provide an annular space at the rear of the cylinder 130 for high pressure air to enter. The return of the rack's de-energized position is effected by the tension of spring 18 and the escape of air through a reduced diameter escape port 154. This port 154 has a reduced diameter so that, while a small amount of energizing air can escape through it during actuation, it does not materially hinder the actuation of cylinder 130.

In a typical operation of the foregoing modification of the present invention in which the pad 2 is located in its horizontally adjusted restraint position, the following events would occur. On accident impact, a sensor 132 would be actuated. This would close the circuit between the actuated sensor 132, the battery, and the switch coil 148, thereby actuating coil 148. Actuation of coil 148 would open contacts 144 and close contacts 146. The opening of contacts 144 would break the circuit between the clutch 12, the battery, the switch 134 and the horizontal adjustment circuit shown in FIG. 9, thereby releasing the clutch 12. At the same time, the closing of contacts 146 would close the circuit between the battery, the switch 134, and valve 138, thereby actuating valve 138. The actuation of valve 138 would, in turn, communicate the cylinder 130 with the source of pressurized air 136, thereby actuating the cylinder 130 and forcing the rack 128 outwardly. This movement of the rack, via sleeve 124, increases the tension on spring 18. With the clutch 12 released, the arms 8, 6, and 4 and the pad 2 would move rearwardly from the restraint position until the pad 2 contacted the occupant's torso. Since the rack's movement and consequent spring tension has just commenced, the pad 2 would contact the occupant's torso at a relatively low force value. This would minimize impact shock from the pad 2. As the rack 128 continued its travel, the force of the pad 2 against the occupant would increase until maximum rack travel and force was reached and the occupant would be resiliently clamped in place. At a predetermined time after actuation of sensor 132, the time delay feature of switch 134 would de-activate the cylinder and the rack 128 and spring tension would return to their original condition. This would reduce the force of the pad against the occupant to its normal value so that the restraint pad 2 could be readily moved out of position.

By slightly modifying the structure of the electromagnetic clutch 12 and the embodiment of the automatic restraint system 120, it is possible to reduce the time required to release the clutch 12 after an accident impact by providing a quick release means on the clutch. On clutch release at impact, friction pad 32 should freely rotate a fraction of a revolution to complete vehicle occupant restraint. However, without spaced separation, the clutch faces might tend to remain in loose frictional contact, thereby reducing complete freedom of rotation of pad 32. It is preferred that the clutch faces be forcibly separated contemporaneously with the clutch de-energization. This separation becomes more important after a vehicle has been in use for some time when clutch faces may be roughened by wear, or may have some residue of magnetism. FIG. 3B illustrates a preferred embodiment of this modified clutch 12'' in which an air jet arrangement 158 is used to facilitate separation of the friction pad 32 from the clutch 12''. In this embodiment, the outer face 160 of the clutch 12'' is internally champfered at its edge of intersection with the shaft 10. This provides an annular air space 162 which extends around the circumference of the shaft 10 and which is defined by the outer circumference of the shaft 10, the outwardly inclined champfer surface 164, and the confronting face of the friction pad 32 (when the clutch 12'' is engaged).

The shaft 10' is provided with a centrally-disposed, axially extending internal bore or passageway 166 (FIG. 4B) which extends internally from the end of the shaft 10 adjacent the collar 22' to a point adjacent the outer face of clutch 12''. A plurality of open ports 168 extend radially outwardly from the bore 166 at a point adjacent to the outer face and communicate the bore 166 with the air space 162. The end of the bore 166 adjacent to the colar 22' is joined to an air supply conduit 170 by a coupling 172 so that the air space 162 is capable of being supplied with pressurized air.

In this embodiment of the automatic restraint system, the air space 162 is selectively supplied with pressurized air when the clutch 12'' is de-energized so that the air supplied may press outwardly against the pad 32 and force it outwardly from the clutch 12'' to a position where it is spaced from the clutch 12''. The supplied air would also pass into and through the resulting space, blowing away dust and establishing a lubricating air film between the outer face 160 of the clutch 12'' and the friction pad 32. To facilitate and speed the outward movement of the pad 32, and to minimize the resultant outward thrust effect due to the pressurized air, the outer boss 30 of the rotatable arm 8 may be provided with a radial ball thrust bearing assembly 176 comprising an inner race 176a, an outer race 176b, a plurality of ball bearings 176c, and a bearing cage (not shown). This bearing assembly 176 is disposed within a bearing retention cavity 178 with the inner race 176a seated against the face 14' of the collar 14, while mounted on the enlarged diameter extension 15 and with the outer race 176b seated against the shoulder 30' of the boss 30.

Figure 10A:
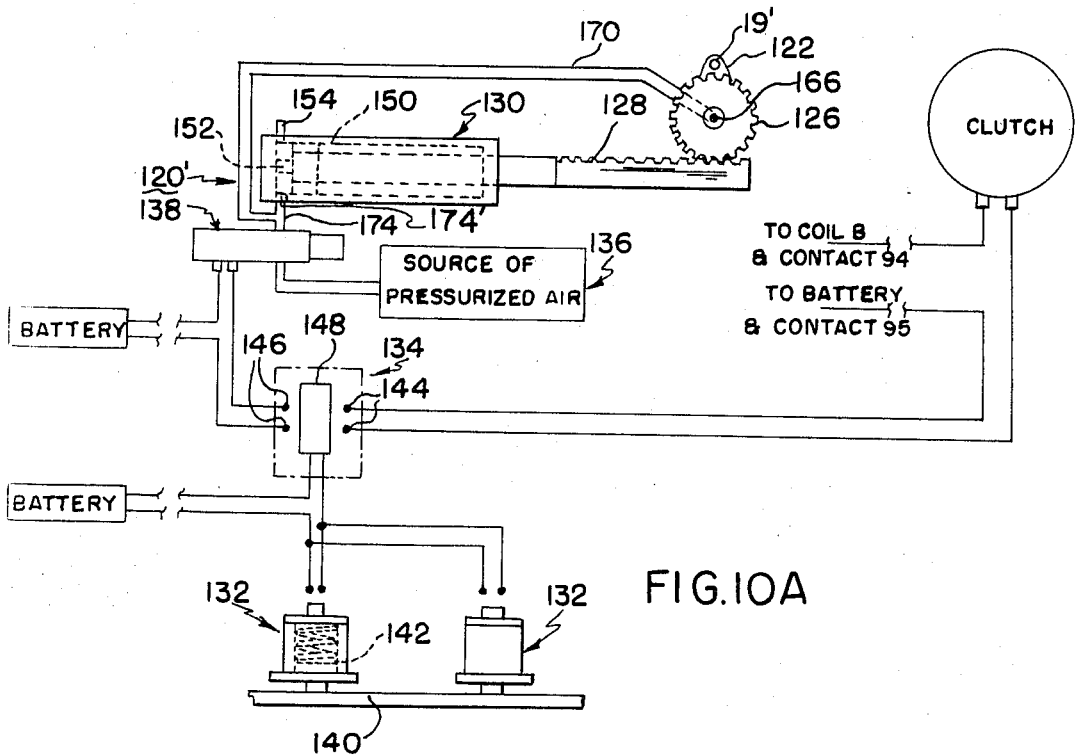
FIG. 10A is a diagrammatic representation of a modified embodiment of the automatic restraint system shown in FIG. 10.

In the modified embodiment of the automatic restraint system 120', FIG. 10A, the air space 162 is preferably selectively supplied with pressurized air by tapping the supply conduit 170 into the air conduit 174 which communicates the cylinder 130 with the valve 138. By this arrangement, upon actuation of the valve 138 to actuate cylinder 130, pressurized air would also actuate the air jet 158 by passing through the supply conduit 170, the internal bore 166 and the ports 168 and into the air space 162. Since the clutch 12'' would be de-energized, the pressurized air would force the pad 32 away from the clutch face 160. The bearing assembly 176 would facilitate this outward movement. In other respects, the automatic restraint system 120' would be constructed and would operate the same as the previously discussed automatic restraint system 120.

The impact sensing device as shown actuates three contemporaneous operations-magnetic clutch release, air jet clutch separation, and air cylinder spring pressure intensification — with the possibility of differential timing between these operations. It is preferable that the clutch release and clutch separation should be simultaneous, but that the spring pressure intensification should not precede the clutch release and separation operations.

Differential timing of the air units 158 and 130 to slightly delay the completion of the operation of the air cylinder 130 with respect to the air jet actuation can be obtained by the select sizing of the cylinder's air entrance port 174' in relation to the air jet ports 168. This can insure that the restraint pad contacts the occupant's torso prior to the effective spring intensification.

Differential timing can also be obtained electrically by installing a suitable time delay circuit and providing an independent supply of pressurized air to the air jet 158. In this instance, the supply conduit 170 could be communicated directly to the source of pressurized air 136 and provided with a selectively actuable valve, such as a spring return, solenoid pneumatic valve similar to valve 138, connected to contacts 146 of switch 134. A suitable time delay circuit would be connected between the valve 138 and the contacts 146 to give the following sequence. For example, with the time delay circuit connected as aforesaid it would insure that the complete energization of the cylinder 130 would not precede the operation to separate the clutch faces by air jet.

Other methods of clutch face separation could be used, for example, by placing a coiled compression spring betwen the clutch faces and around shaft 10. This, however, would require an increase in magnetic clutch power to close the clutch while overcoming the spring's force, and would add some rotational friction to clutch pad 32. Also, it does not lend itself to the aforesaid time differential control. Therefore, the forcible separation of the clutch faces by air is the preferred embodiment.

Figure 3:
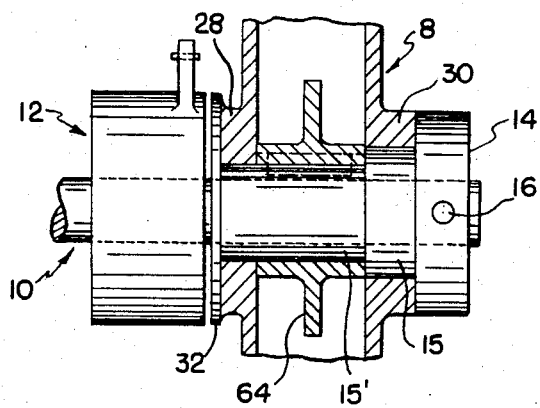
FIG. 3, is an enlarged fragmentary front elevation view, partially cut away and partially in section, illustrating the clutch mechanism 12 of FIG. 1.
Figure 3A:
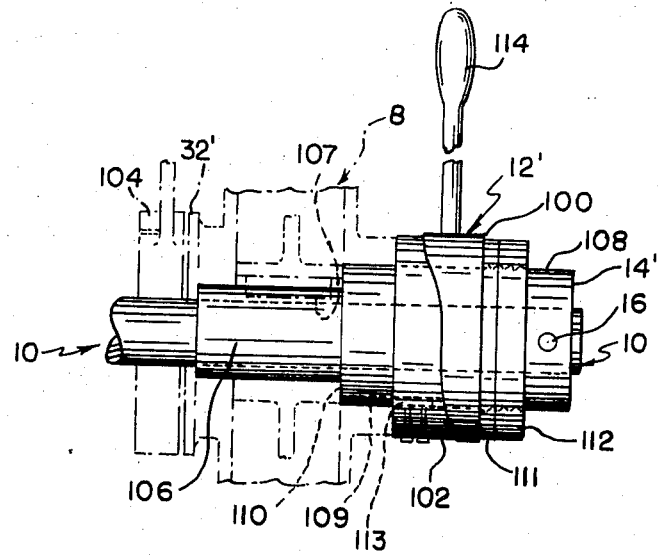
FIG. 3A is an enlarged fragmentary front elevation view, partially cut away and partially in section, illustrating a modified embodiment of a clutch mechanism 12' for use in the device of FIG. 1.
Figure 3B:
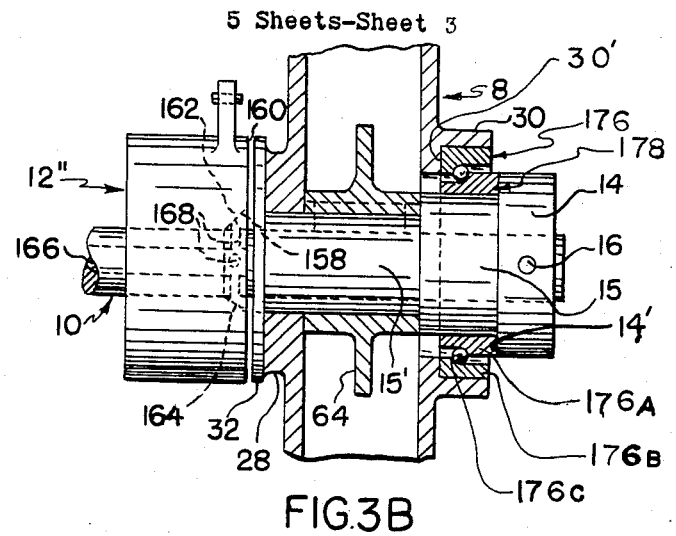
FIG. 3B is an enlarged fragmentary front elevation view, partially cut away and partially in section, illustrating a further modified embodiment of a clutch mechanism 12" for use in the device of FIG. 1.

While the device 1 of the present invention has been discussed utilizing an electromagnetic clutch (FIGS. 1, 3 and 4), a mechanical clutch 12', such as that shown in FIG. 3A, can be used where the automatic passive restraint is not desired. This clutch 12' utilizes a pair of cam action collars 100 and 102 to shift the friction disc 32' against a stationary plate 104 via transverse shifting of the rotatable arm 8. In this form of the device 1, the annular collar 14' is modified so that it extends from the interior face of the friction disc 32' to a point adjacent the end of the shaft 10. However, it is still rigidly fixed to the shaft 10 by lock pin 16. The collar 14' includes a reduced diameter portion 106 provided with a slot 107 for the sprocket key and an enlarged diameter portion 108 also provided with a slot 109. The enlarged diameter portion 108 extends outwardly from the outer face of the lower sprocket collar while the reduced diameter portion 106 extends inwardly from that point. The inner face 110 of the enlarged diameter portion 108 abuts the sprocket collar and acts as a stop against outward transverse travel of the arm 8. The camming collars 100 and 102 are held in place and the air gap between the disc 32' and the plate 104 is adjusted by an adjustment collar 111 and a lock collar 112 which are threaded onto the enlarged diameter portion 108. The outer camming collar 100 is freely rotatable on the enlarged diameter portion 108 while the inner camming collar 102 is fixed against rotation on the enlarged diameter portion 108 by the key 113 attached to 102 but can slide transversely along slot 109 in the enlarged diameter portion 108. Therefore, upon rotation of the outer camming collar 100, such as by a handle 114, the inclined camming faces ride against each other, pushing the inner camming collar 102 inwardly away from the outer collar 100 and the threaded collars 111 and 112. This causes the key 113 to slide along the slot 109, and the inner collar 102 to thrust the disc 32' against plate 104 via the structure of arm 8.

By the foregoing arrangement and structure of the elements, there is provided an improved vehicle occupant restraint device. A restraint pad, disposed parallel to the general plane of the occupant's torso, is placed in front of the occupant with a minimum of accompanying supporting structure also being placed in front of the occupant. This reduces the possibility of both entrapment in an accident and injury by striking rigid supports. The aforesaid parallel attitude of the pad is also preserved throughout the adjustment of the horizontal spacing between the occupant and the pad. The pad can be readily swung away from in front of the occupant, such as to pay a toll, and returned to its restraining position without affecting the horizontal adjustment. In fact, horizontal adjustment can be effected only after swinging the pad out of the way, thereby preventing accidental disengagement and forward movement of the pad when it is in the restraint position. To facilitate rotation of the pad and crossmember out of the way, three handgrips are provided — one on the pad, and two on the crossmember. The swiveling, pad handgrip is at a convenient shoulder height so that where a mechanical clutch is used, one hand can grasp the handgrip to draw the pad down into position and hold it, utilizing the swivel action to avoid changing the grip, while the other hand actuates the mechanical clutch.

In the modified form of the present invention in which an automatic system for positive restraint of the occupant is provided, further improvements are effected. Since the restraint pad is already in close proximity with the occupant's torso, the pad will develop relatively little inertial force before contacting the occupant, thereby reducing shock to the occupant. This may reduce or eliminate the occupant's fear of being struck by a restraint device during an accident. In addition, the short travel distance reduces the elapsed time between the accident event and the application of restraint. The maximum restraining force is developed after the pad has contacted the occupant and not before. Since the restraint force is applied by resilient spring pressure and the pad itself has a resilient construction, the occupant is resiliently held in place during an accident. Further, where the driver and passengers in the front or rear of a vehicle have independent electrically positioned restraints, the vheicle can be wired so that any one impact sensor can simultaneously automate all of the aforesaid restraints. In conclusion, the pad is moved into position using only a single handgrip which has a built-in electric switch. The automatic power system for the pad, will on impact, resiliently secure the occupant to the seat for a few seconds, then the automatic system becomes unpowered. The pad can then be removed quickly by one hand to the rear of the occupant's seat. Still further, if for any reason the automatic system should fail, the pad 2 would still be in its restraint position to act as a resilient fail safe restraint.

The terms and expressions which have been used are used as terms of description and not of limitation, and there is no intention in the use of such terms and descriptions of excluding any equivalents of any of the features shown and described, or portions thereof, and it is recognized that various modifications are possible within the scope of the invention claims.

I claim:

1. A vehicle safety device adapted for ultra-rapidly restraining a vehicle occupant from movement comprising:
    a resilient restraint pad;
    a support assembly for supporting said pad;
    said pad being attached to the support assembly;
    a positioning and holding mechanism for adjustably positioning and holding said pad in an optimal position in front of and in proximity with a vehicle occupant's torso, said positioning and holding mechanism including a clutch mechanism with a substantially rotationally-fixed clutch surface and a rotatable clutch surface, said support assembly being rotatable with said rotatable clutch surface, said rotatable clutch surface being engagable with said substantially rotationally-fixed clutch surface in a locked position;
    said positioning and holding mechanism operatively connecting said support to said vehicle;
    sensing means for sensing a vehicle accident event;
    release means for applying a positive disengaging force to at least one of said clutch surfaces;
    said release means being actuable by said sensing means;
    power means for moving said restraint pad into contacting engagement with the occupant;
    said power means being actuable by said sensing means;
    switching means for actuating said release means and said power means; and
    said switching means actuating upon the sensing of an accident event by said sensing means.

2. A safety device in accordance with claim 1, wherein
    said release means includes a fluid jet for applying fluid pressure to positively disengage at least one of said clutch surfaces.

3. A safety device in accordance with claim 1, wherein
    said release means includes a fluid jet for applying fluid pressure to said clutch surfaces to positively separate and disengage the same.

4. A safety device in accordance with claim 3, wherein
    said device includes a transverse pivot rigidly attached to said vehicle; and
    said support assembly is rotatably mounted on said pivot for rotation in a longitudinally extending, vertical plane,
    said clutch mechanism being disposed for coacting between said pivot and said support assembly for releasably locking the support assembly with respect to said pivot.

5. A safety device in accordance with claim 4, wherein
    said substantially rotationally-fixed clutch surface is rigidly attached to said pivot.

6. A safety device in accordance with claim 4, wherein
    said support assembly is slidably mounted on said pivot to permit shifting movement of said assembly in a length-wise direction along said pivot.

7. A safety device in accordance with claim 6, wherein
    said support assembly includes bearings which engage said pivot and facilitate said shifting movement.

8. A safety device in accordance with claim 2, wherein
    said release means is fluid-operated, and
    said power means comprises,
        a source of pressurized fluid,
        a fluid-operated motor operatively associated with said support assembly for rotating said assembly upon actuation, and
        a control valve actuated by said switching means for selectively applying pressurized fluid from said source to said fluid-operated motor and said release means.

9. A safety device in accordance with claim 8, wherein
    said power means further includes a timing means operatively associated with said switching means for actuating said fluid-operated motor and said release means at different times.

* * * * *